Figure 18:
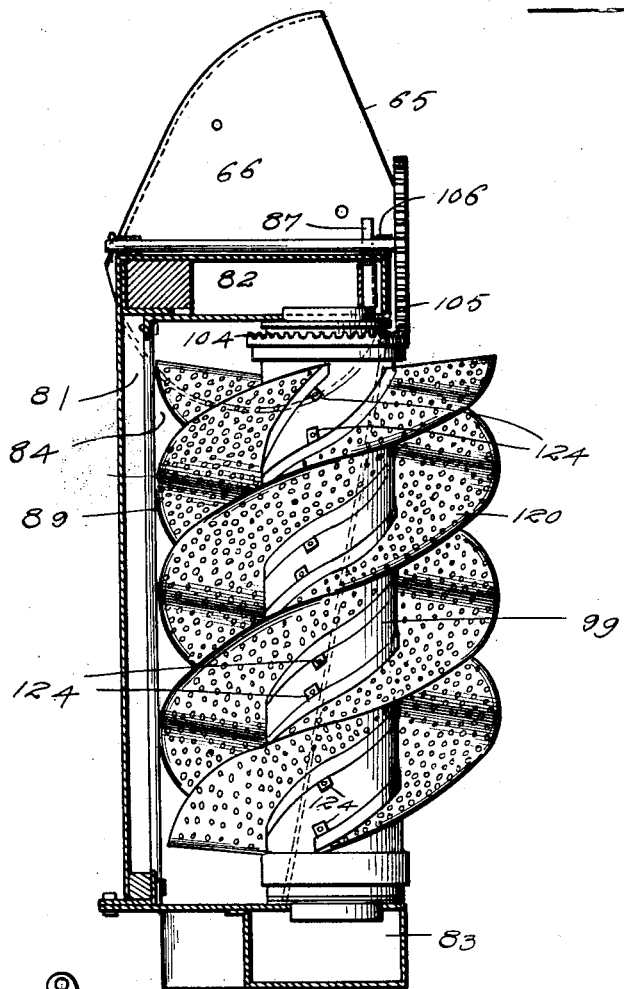

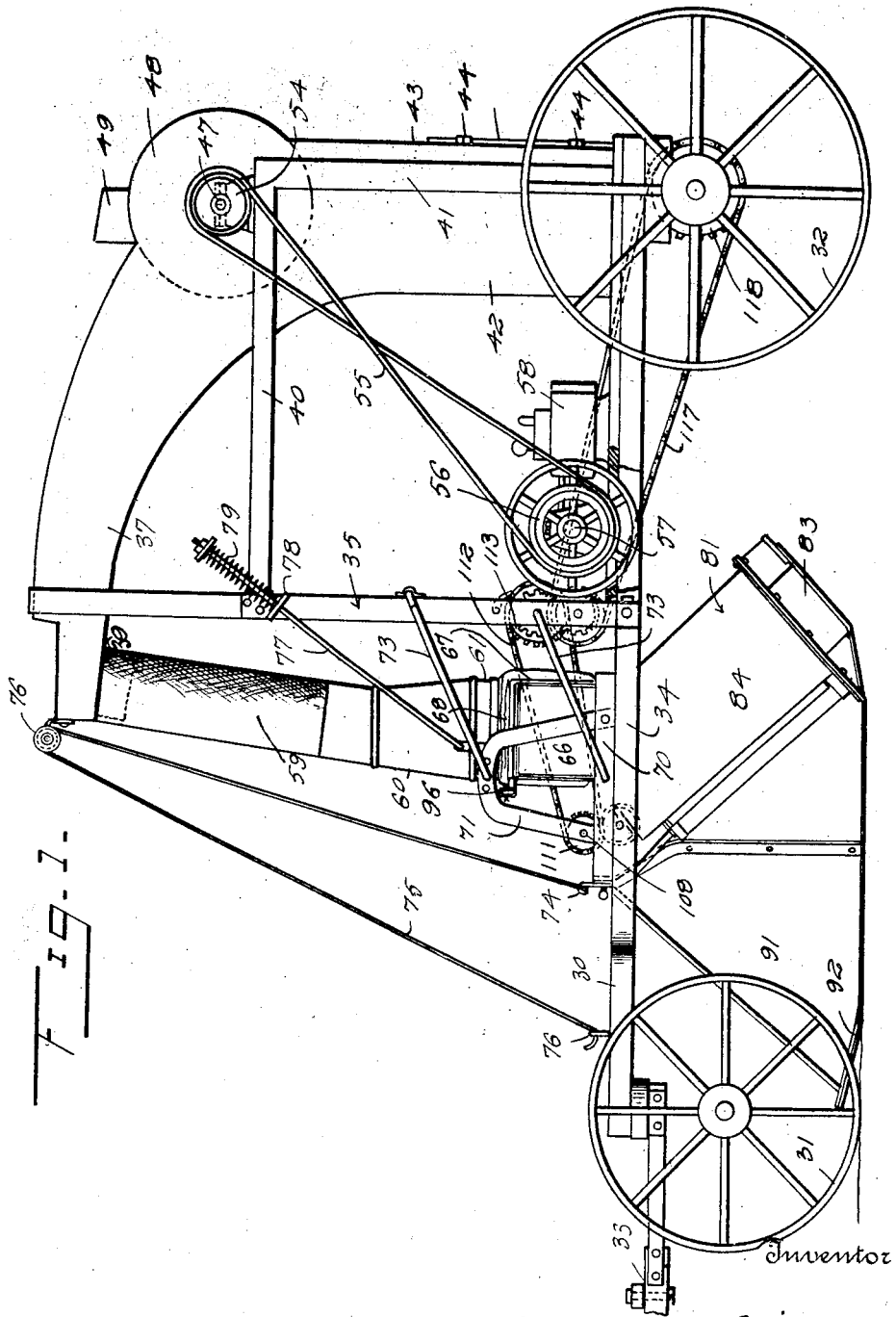

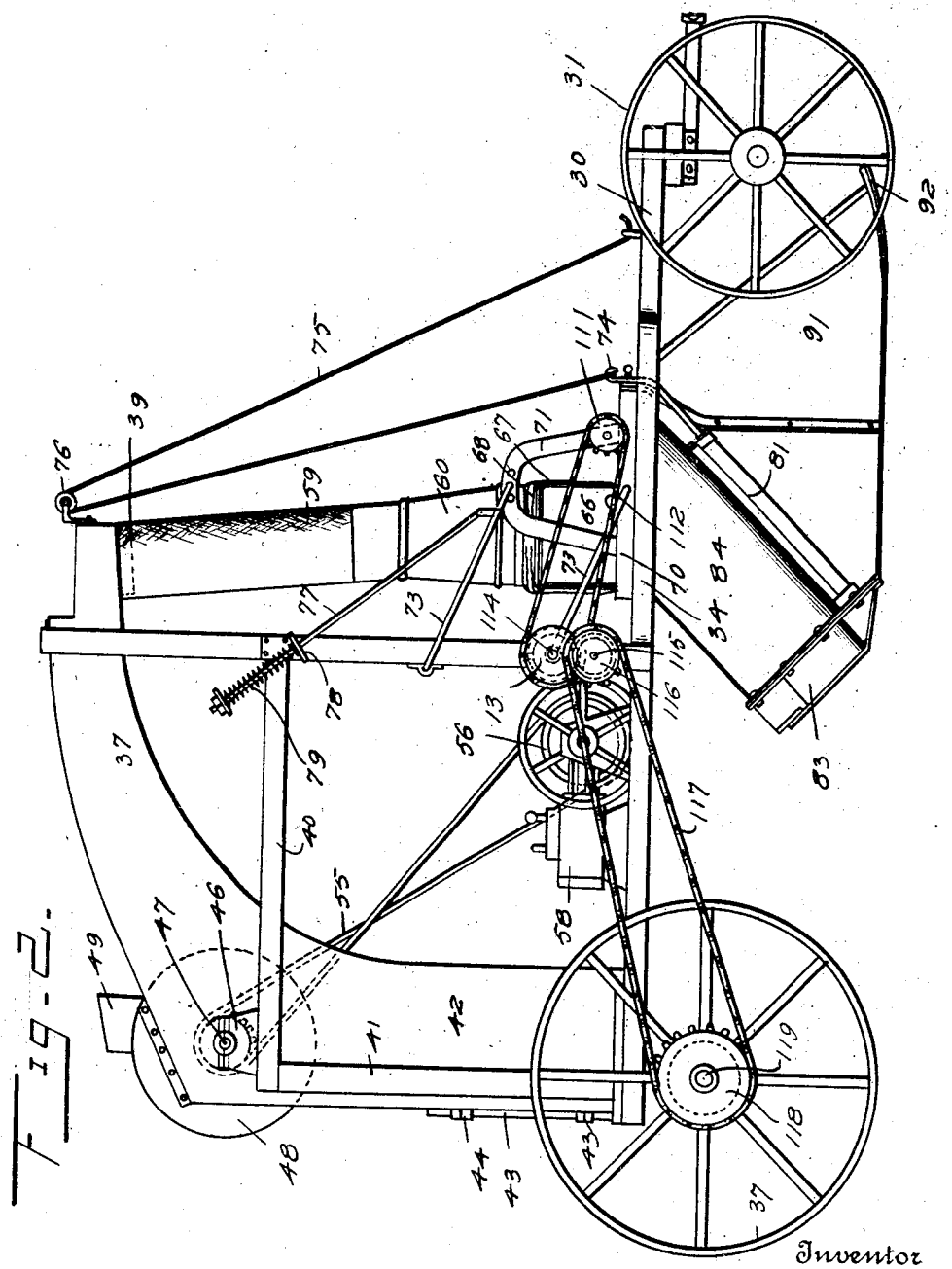

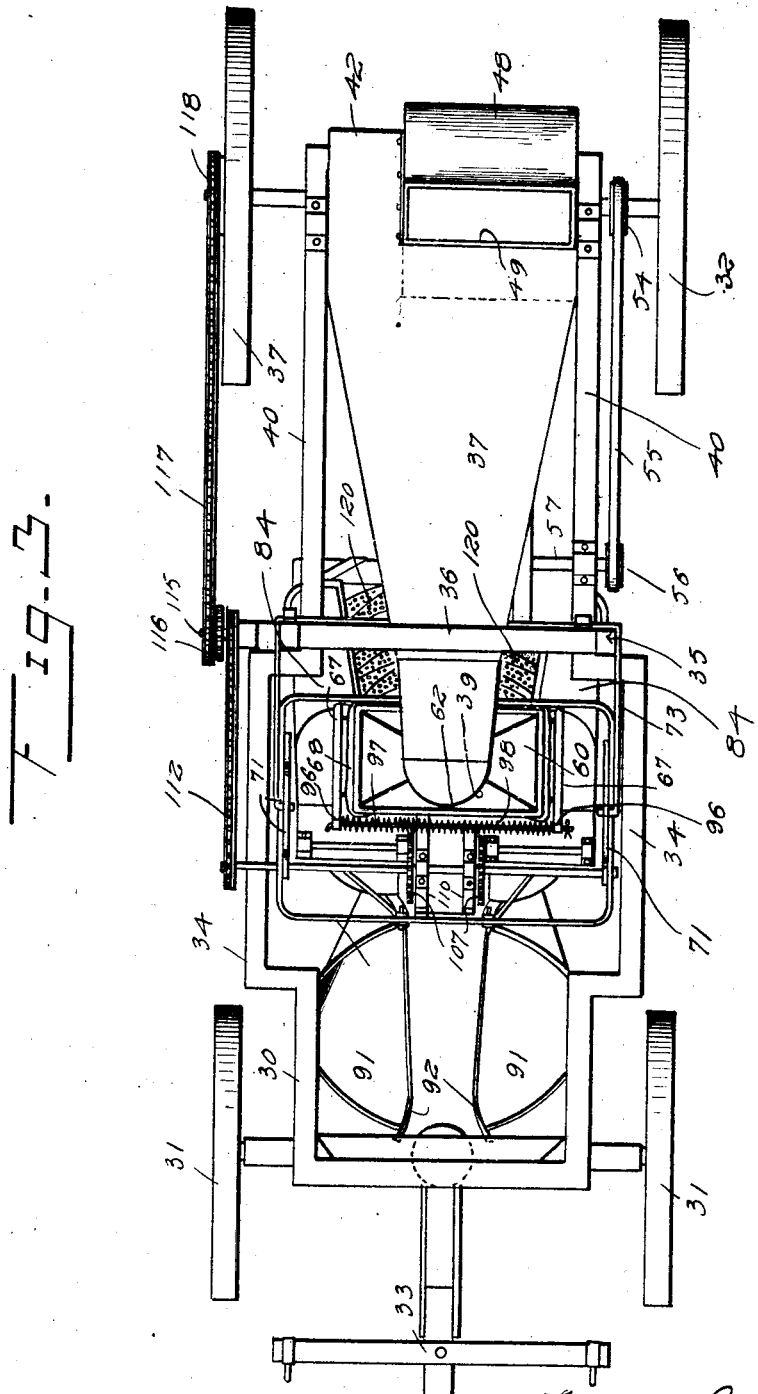

A. J. GIPSON.
COTTON PICKING MACHINE.
APPLICATION FILED MAY 17, 1920.
1,378,021.
Patented May 17, 1921.
16 SHEETS—SHEET 4.
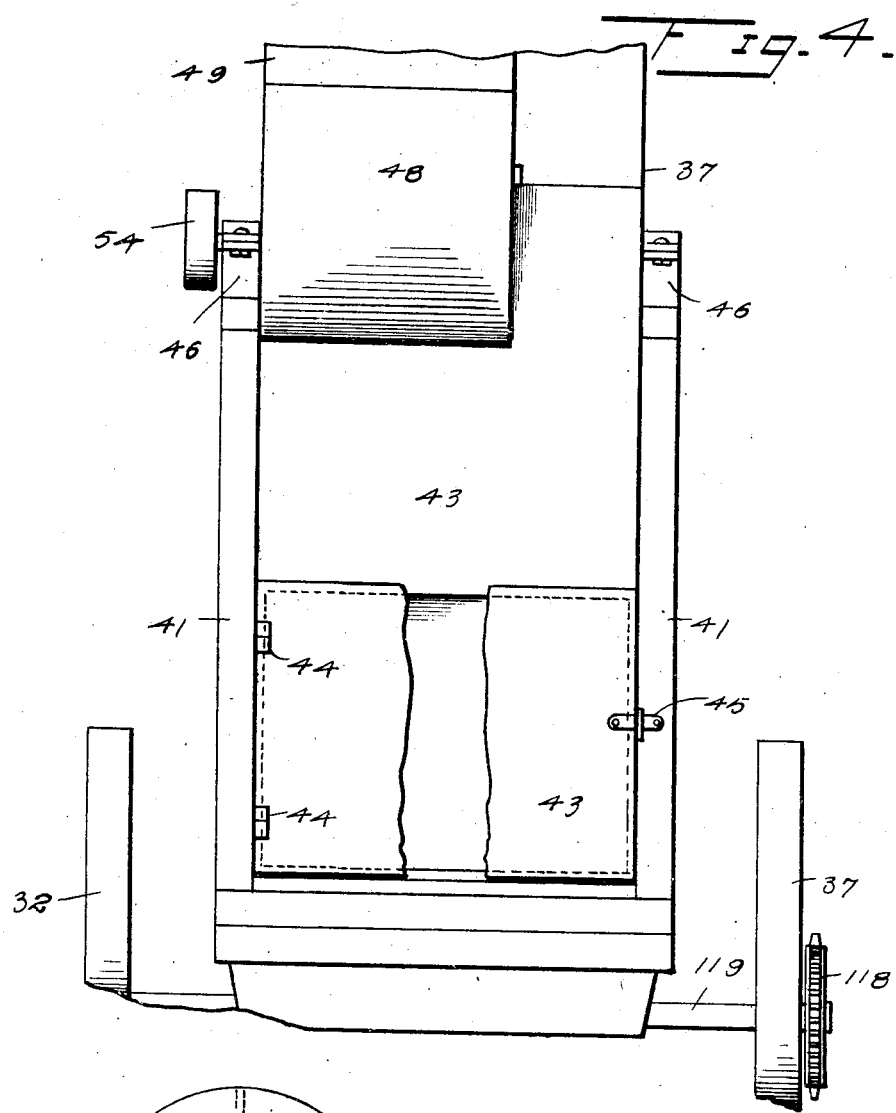
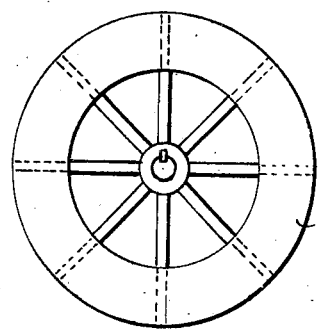
Inventor
Andrew J. Gipson
By Thomas R. Harney
Attorney

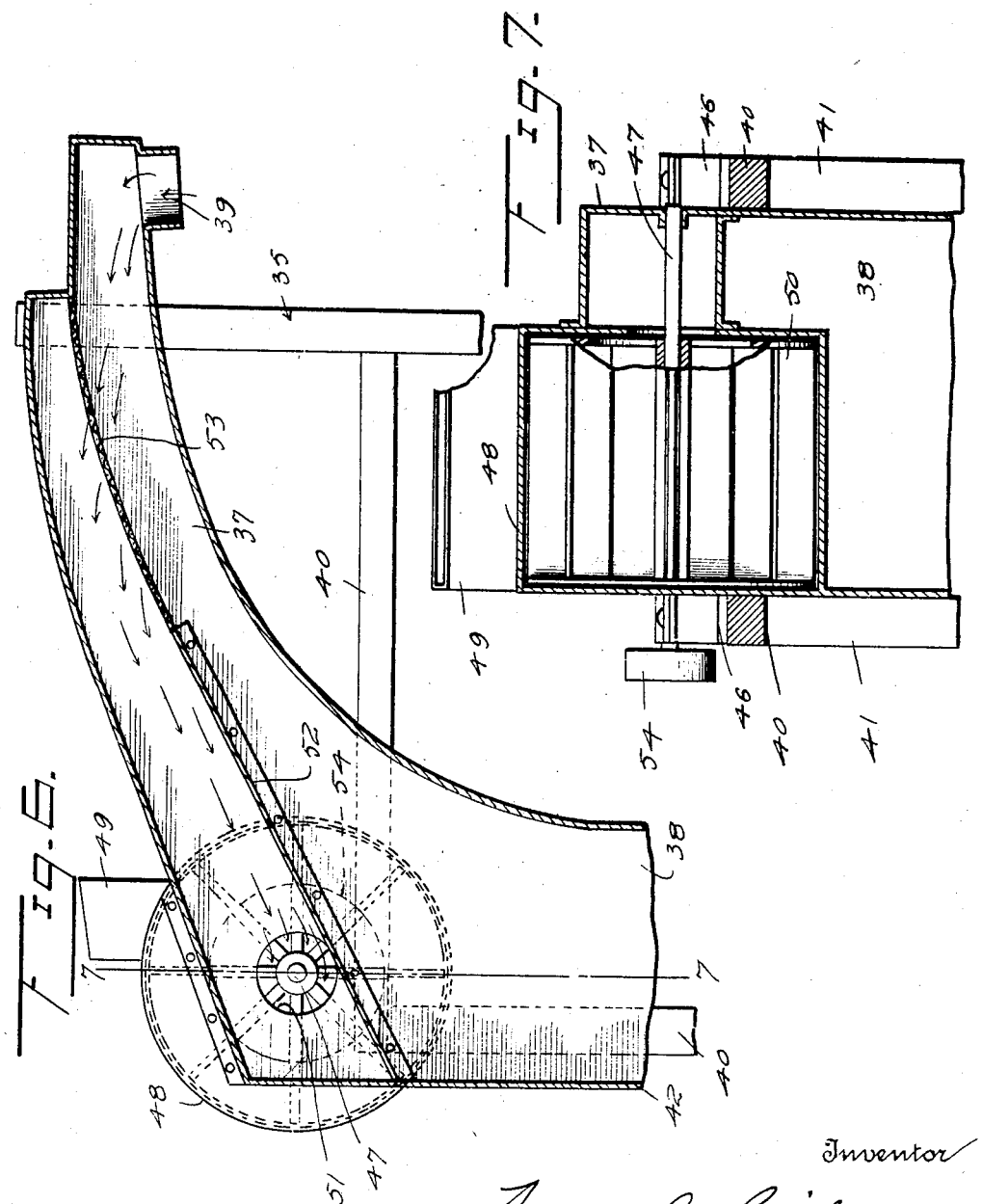

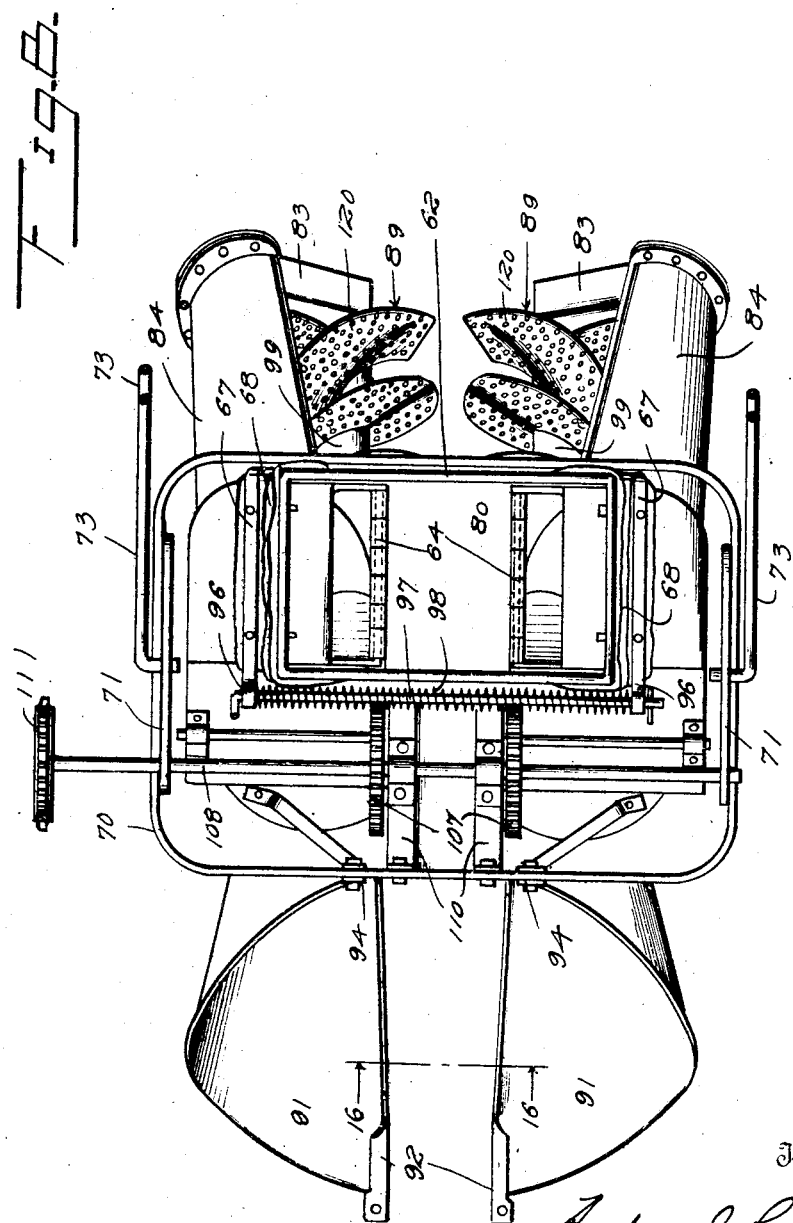

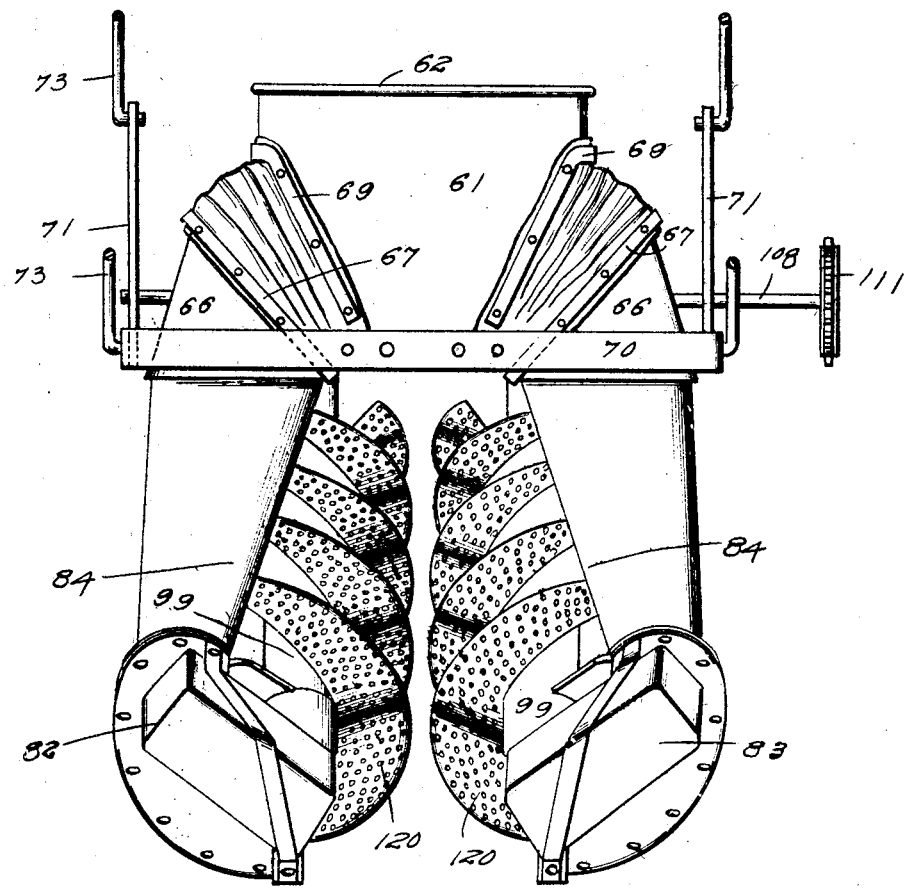

A. J. GIPSON.
COTTON PICKING MACHINE.
APPLICATION FILED MAY 17, 1920.

1,378,021.

Patented May 17, 1921.
16 SHEETS—SHEET 8.

Fig. 10.

Andrew J. Gipson
Inventor

By Thomas R. Harney
Attorney

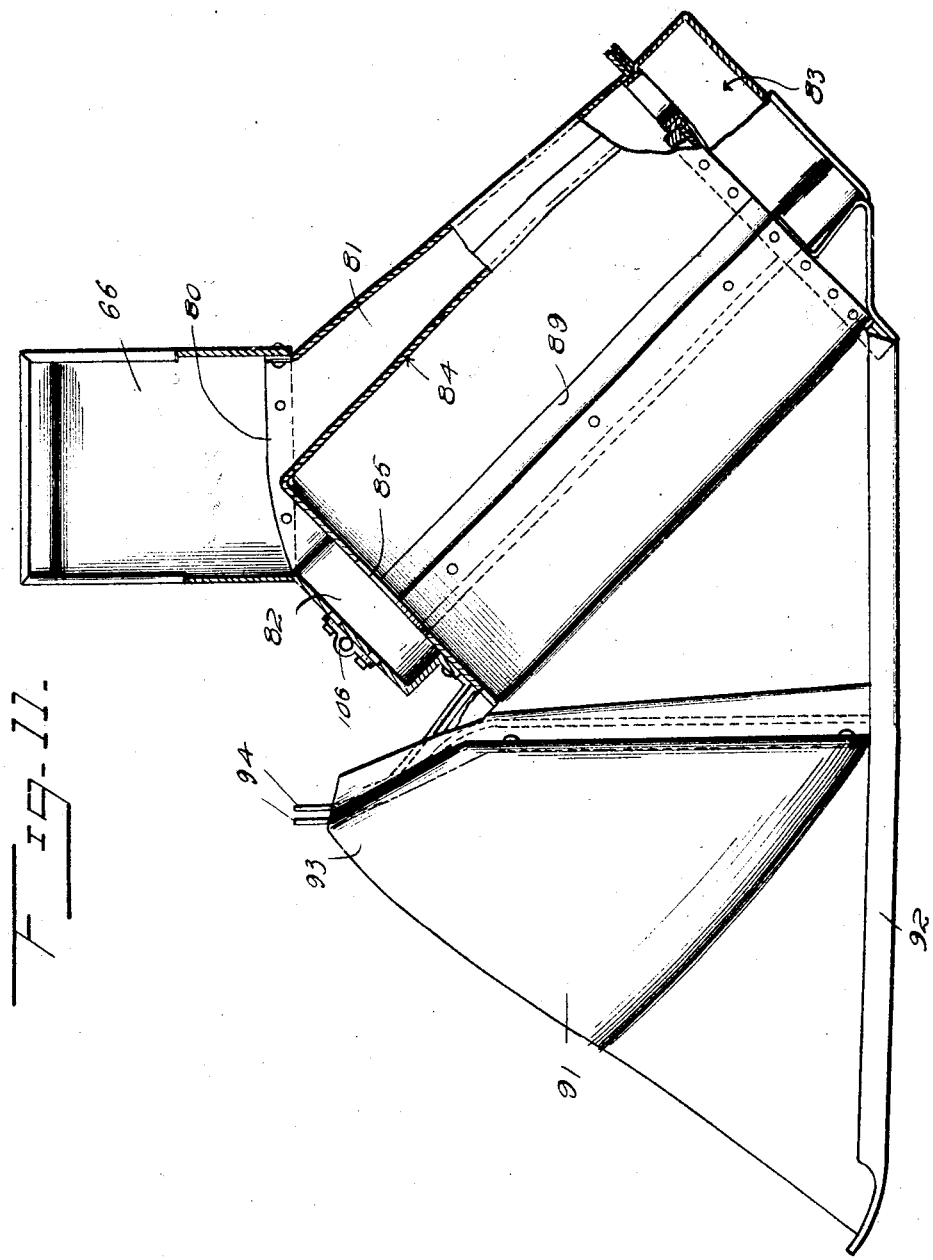

A. J. GIPSON.
COTTON PICKING MACHINE.
APPLICATION FILED MAY 17, 1920.
1,378,021. Patented May 17, 1921.
16 SHEETS—SHEET 10.
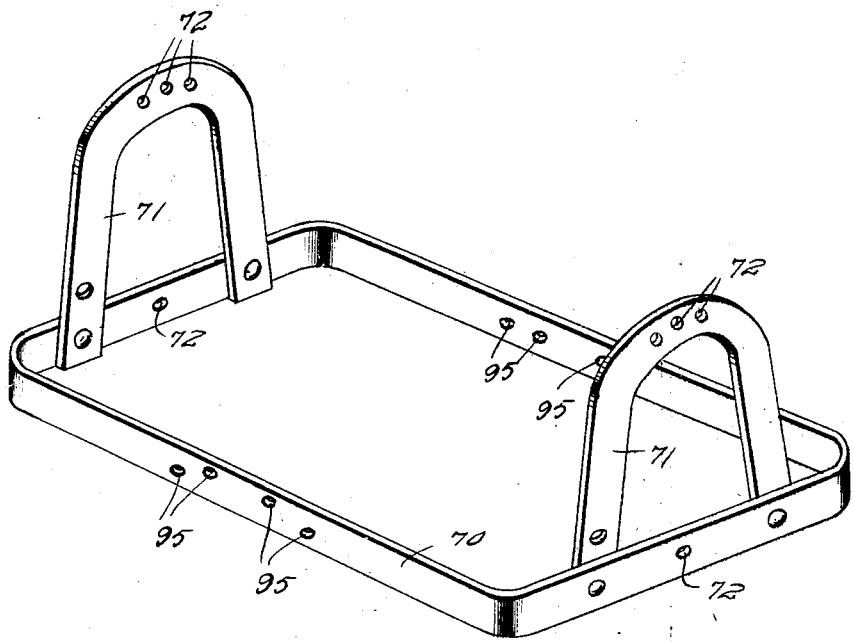
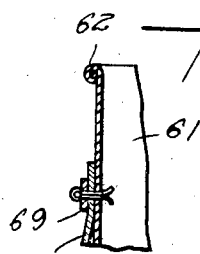

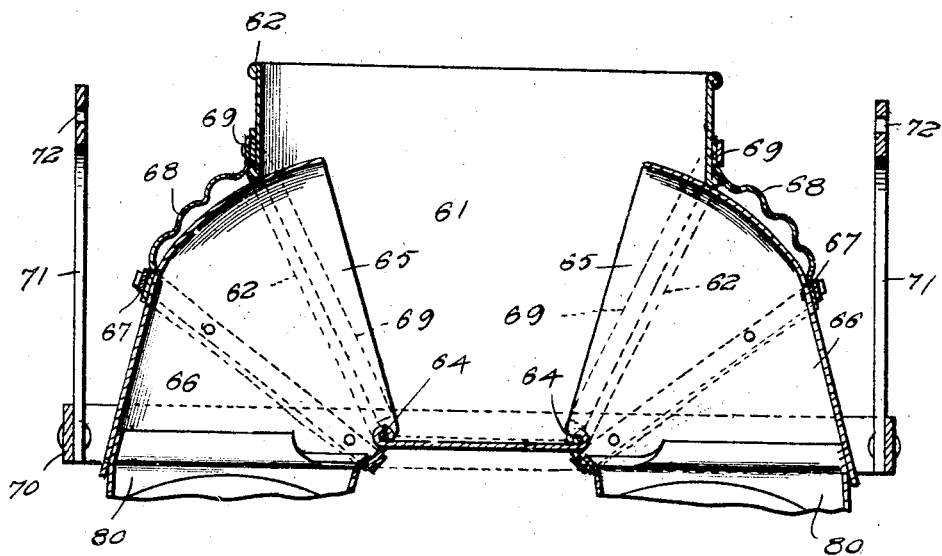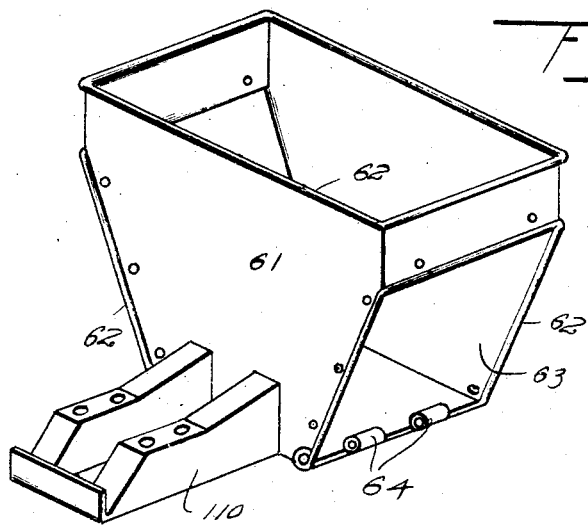

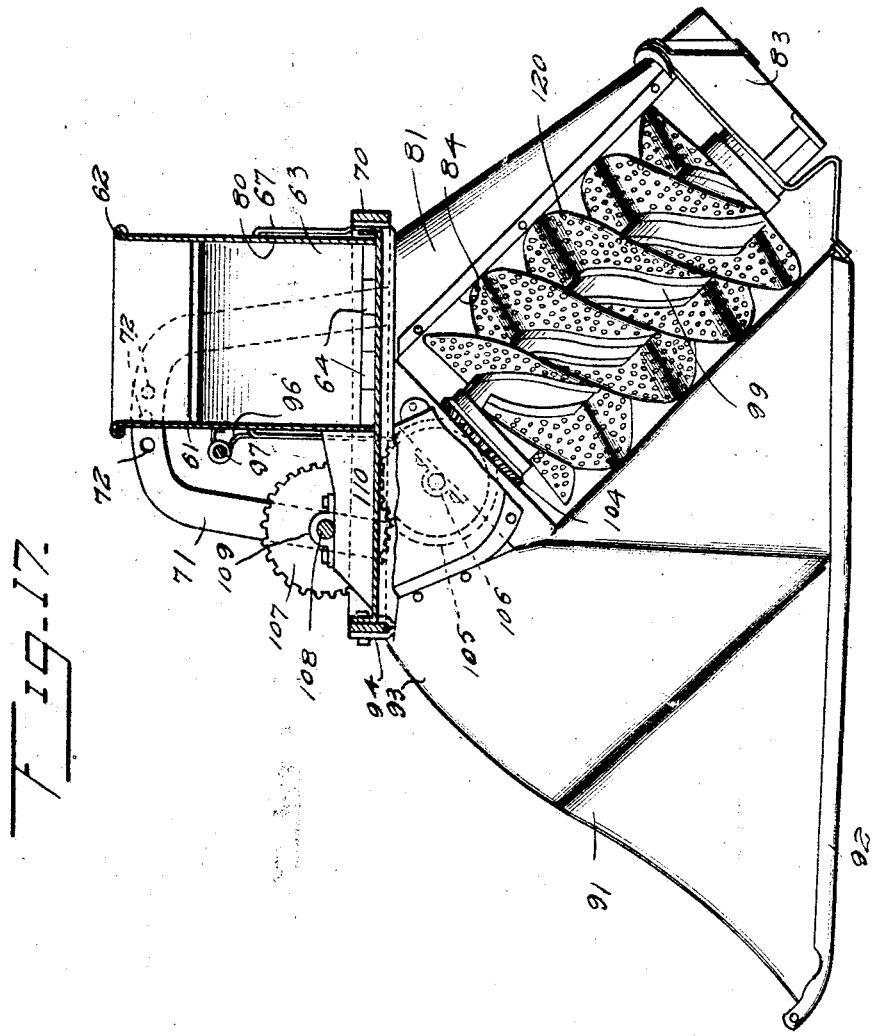

A. J. GIPSON.
COTTON PICKING MACHINE.
APPLICATION FILED MAY 17, 1920.

1,378,021.

Patented May 17, 1921.
16 SHEETS—SHEET 13.

Andrew J. Gipson
Inventor

By Thomas R. Harne
Attorney

A. J. GIPSON.
COTTON PICKING MACHINE.
APPLICATION FILED MAY 17, 1920.

1,378,021.

Patented May 17, 1921.
16 SHEETS—SHEET 14.

Inventor
Andrew J. Gipson
By Thomas R. Harney
Attorney

A. J. GIPSON.
COTTON PICKING MACHINE.
APPLICATION FILED MAY 17, 1920.
1,378,021.
Patented May 17, 1921.
16 SHEETS—SHEET 15.
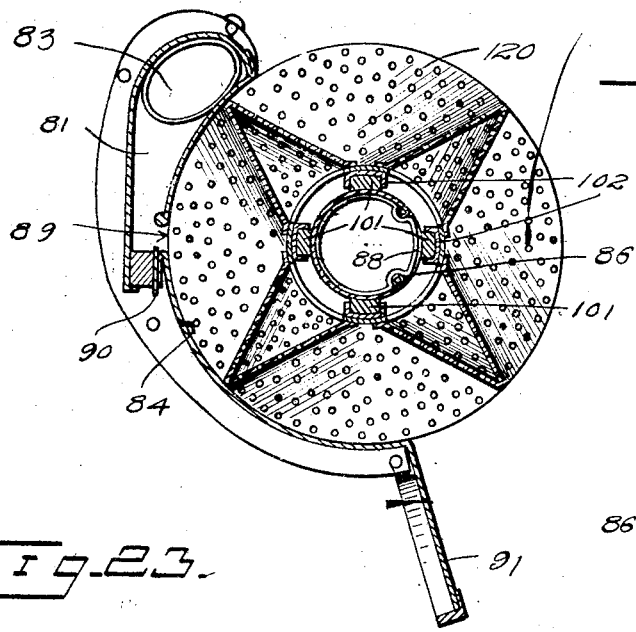
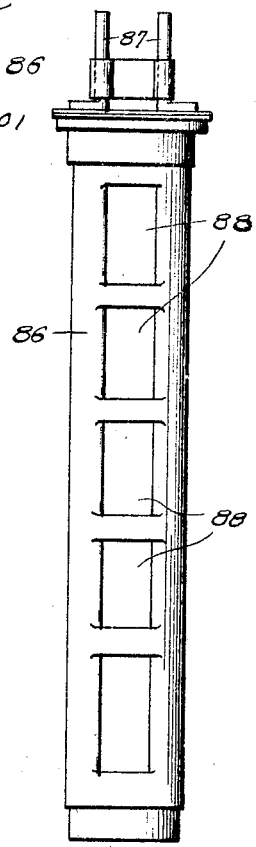
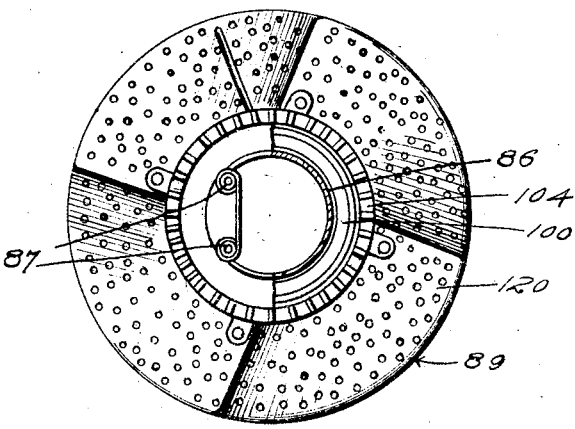
Inventor
Andrew J. Gipson
By Thomas R. Harner
Attorney A. J. GIPSON.
COTTON PICKING MACHINE.
APPLICATION FILED MAY 17, 1920.
1,378,021. Patented May 17, 1921.
16 SHEETS—SHEET 16.
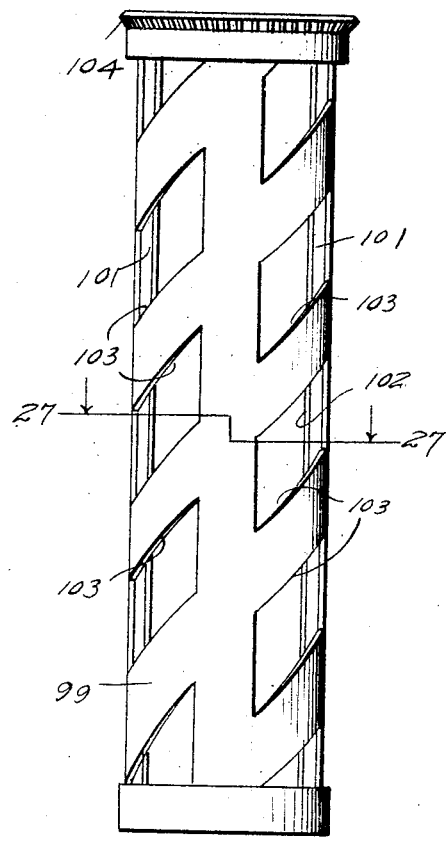
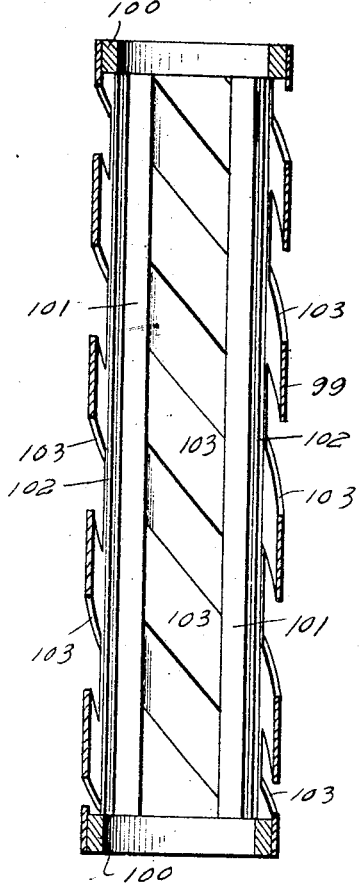
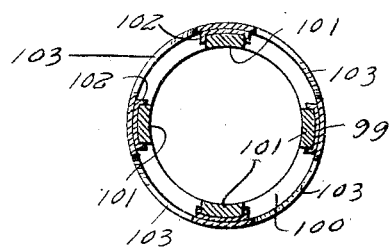
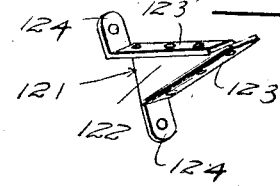
Inventor
Andrew J. Gipson
By Thomas R. Harner
Attorney

UNITED STATES PATENT OFFICE.

ANDREW J. GIPSON, OF PERKINS, OKLAHOMA.

COTTON-PICKING MACHINE.

1,378,021.   Specification of Letters Patent.   Patented May 17, 1921.

Application filed May 17, 1920. Serial No. 381,871.

*To all whom it may concern:*

Be it known that I, ANDREW J. GIPSON, a citizen of the United States of America, residing at Perkins, in the county of Payne and State of Oklahoma, have invented certain new and useful Improvements in Cotton-Picking Machines, of which the following is a specification.

My present invention relates generally to cotton picking apparatus, and more particularly to apparatus employing suction either in whole or in part for this purpose, my object being the provision of a mechanism which will operate to effectively and efficiently remove locks of cotton from cotton hulls without injuring the stalks, limbs or foliage of the cotton plants, as well as one which will so operate in connection with bushy or sparse, tall and short plants within a considerable range.

A further object of the invention is the provision of a portable machine in which the cotton picking device is mounted for movement along the rows of cotton in such a way as to avoid the necessity of anything but the mechanical contact of the picking device with the cotton plants.

A still further object is the provision of an apparatus in which the plants will be guided into and through the picking devices and so engaged and manipulated as to straighten out their branches in order that the cotton bolls may be presented in an accessible relation to the means employed for the removal of the locks.

Another object of the invention is the provision of a picking apparatus of a movable nature in which the actual withdrawal of the locks of cotton is effected mechanically by means employing suction holding the cotton in connection with the lock withdrawing means during the withdrawing operation.

Figure 19:
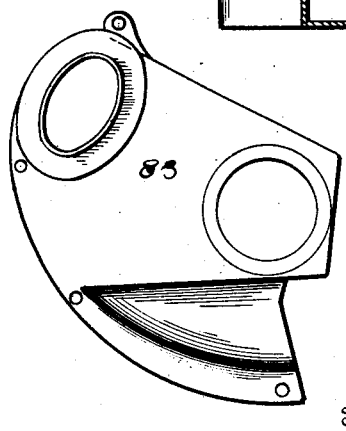
Figure 20:
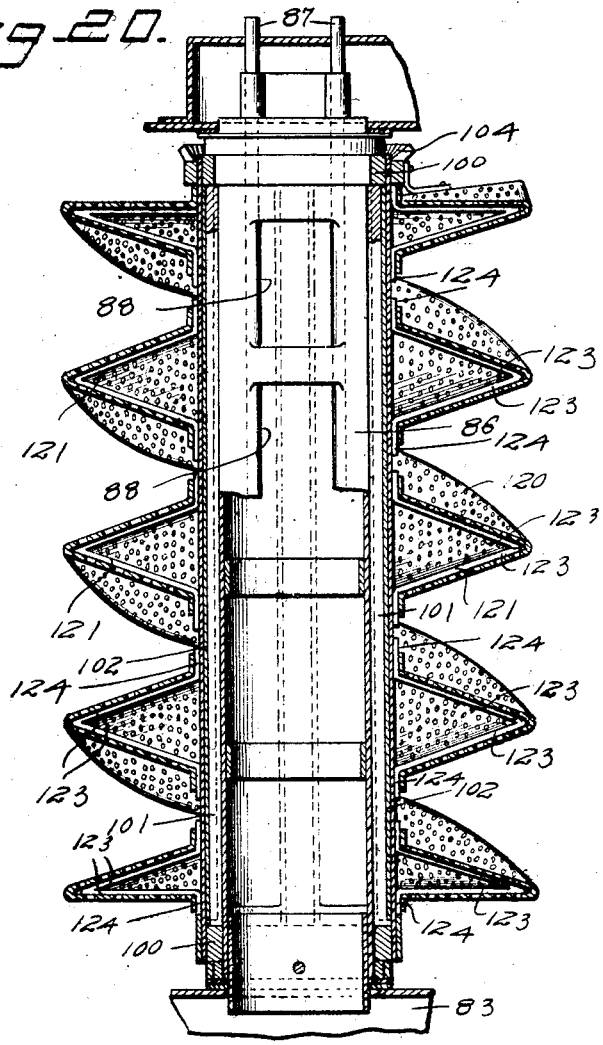
Figure 21:
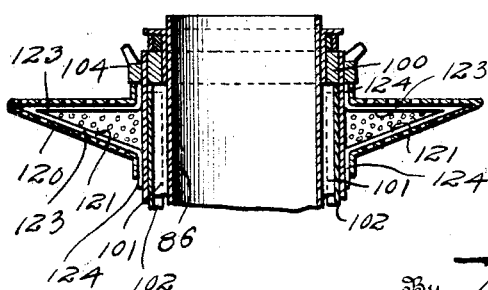

Other and more particular objects of my invention will be apparent from the following description of the machine and its several parts, its construction and operation, in which reference is made to the accompanying drawings, forming a part of this specification, and in which, Figure 1 is a side elevation looking at the left hand side of the complete machine, Fig. 2 is a side elevation of the right hand side thereof, Fig. 3 is a top plan view, Fig. 4 is a partial rear elevation, Fig. 5 is a detail side view of the fan, Fig. 6 is a vertical longitudinal section through the upper portion of the suction casing and the cotton collecting chamber, Fig. 7 is a vertical transverse section taken on line 7—7 of Fig. 6, Fig. 8 is a top plan view of the picking mechanism removed, Fig. 9 is a rear elevation thereof, Fig. 10 is a front elevation thereof, Fig. 11 is an elevation looking at the inside of one of the guide members and suction casings, the latter being partly broken away and in section, Fig. 12 is a detail perspective view of the movable supporting frame of the picking mechanism, Fig. 13 is an enlarged vertical transverse section through the upper cross box and suction casing hoods together with the movable supporting frame, Fig. 14 is a detail perspective view of the cross box removed, Fig. 15 is a detail vertical section through a portion of the cross box illustrating the manner of attaching the flexible connection, Fig. 16 is an enlarged detail transverse section through the lower adjacent portions of the two guide wings taken on line 16—16 of Fig. 8, Fig. 17 is a vertical longitudinal section through the picking mechanism, Fig. 18 is a vertical transverse section through one of the suction casings with the movable picking member in elevation, Fig. 19 is a top plan view of one of the tail boxes removed, Fig. 20 is a vertical section through one of the movable picking cylinders and its parts showing the upper portion of its journal tube in elevation, Fig. 21 is a section through the upper portion of the picking cylinder and the journal tube of Fig. 20, Fig. 22 is a horizontal section through one of the movable picking devices and its suction casing, Fig. 23 is a top plan view of one of the movable picking members, Fig. 24 is a detail side view of one of the hollow journal tubes, Fig. 25 is a side elevation of one of the picking cylinders with the perforate spirals removed, Fig. 26 is a longitudinal section through the cylinder of Fig. 25, Fig. 27 is a transverse section on line 27—27 of Fig. 25, and Fig. 28 is a detail perspective view of one of the attaching brackets of the perforate spirals.

Referring now to these figures and particularly to Figs. 1 to 7 inclusive my invention proposes a machine the frame of which includes a horizontal platform 30 movable upon front and rear wheels 31 and 32 and having at its forward end any suitable draft attachment generally indicated at 33.

The platform 30 may as seen in Fig. 3 consist merely in a frame having laterally spaced longitudinal side bars provided with offset portions 34 intermediate their ends where the picking mechanism, to be hereinafter described, depends through and is vertically adjustable within the frame or platform. Rearwardly of the offset portions 34, the frame of the machine has spaced uprights 35 transversely alined and connected at their upper ends by a cross bar 36, the latter supporting the forward end of the upwardly and forwardly curving extension 37 of the cotton storage chamber 38, which forward extension 37 terminates at its forward end in a downturned spout or neck 39.

Attached to the uprights 35 intermediate the ends of the latter are the forward ends of the upper side rails 40 whose rear ends extend from the upper ends of rear uprights 41, the latter supporting a rear upright casing 42 which forms therein the cotton storage chamber 38 and of which the upper forwardly curving extension 37 is a part. This casing 42 has a lower rear door 43 on hinges 44 at one side and having a catch 45 at its opposite side to normally hold the same in closed position, the hinges 44 and catch 45 being respectively in connection with the opposite rear uprights 41.

At the upper ends of the uprights 41 are mounted bearings 46 for the ends of the fan shaft 47, which latter extends through the upper portion of the cotton storage casing 42 and through an annular fan casing 48 mounted in connection with the casing 42 and having an upper outlet mouth 49. The fan 50 seen in Fig. 5 is secured on the shaft 47 within the casing 48 and has its intake through the opening 51 of the adjacent side wall of the fan casing, opening 51 communicating with the upper portion of the storage casing 42 above a partition 52 projecting forwardly in the extension 37 and forming the top of the cotton storage chamber 38. The forward end of this partition 52 which is imperforate, connects with the rear end of a perforate partition 53 through the latter of which the air is drawn toward the fan casing 48 above the partition 52, leaving the cotton below the partition so that it can drop into the storage casing 42.

At one end the fan shaft 47 has a pulley 54 connected by a belt 55 with a driven pulley 56 whose shaft 57 is driven from an engine or motor 58 on the frame or platform 30.

The depending spout 39 of the extension 37 of the cotton storage casing 42 is connected by a flexible cotton conduit 59 with the upper open end of a cylindrical connecting member 60 whose lower flanged rim is secured around the upper open end of a cross box 61 situated above the central portion of the frame platform 30 and having reinforced edges 62 around its upper opening and around its angular downwardly inclined side openings 63. Along the lower edges of the side openings 63 are hinges 64 connecting the upper inwardly curved portions 65 of a pair of laterally and downwardly extending hoods 66 of tubular form, which are thus swingable in vertical planes transversely of the cross box 61 on the hinges 64. To the outer surfaces of these hoods, as most plainly seen in Fig. 13, are secured rings 67 joining to the hoods the outer edges of flexible webs 68 whose opposite edges are secured by bands 69 to the cross box 61 around its side openings 63 so as to span the flexible joints between these parts and prevent the leakage of air.

The lower portion of the cross box 61 and the lower portions of the hoods 66, are disposed within a rectangular supporting frame 70 having side uprights 71 of the inverted U-form particularly seen in Fig. 12, which uprights and the sides of the frame 70 have openings 72 to receive the forward ends of U-shaped supporting rods 73 disposed in vertically spaced parallel relation with their cross bars journaled in connection with the intermediate side uprights 35 of the frame so that the said rectangular supporting frame 70 is thus shiftable vertically and is at the same time maintained in horizontal position. At the forward portion of the vertically adjustable supporting frame 70 of the picking mechanism is secured a hook 74 which receives one end of a flexible connection 75 extending upwardly therefrom and forwardly and downwardly around a roller 76 on the forward end of the extension 37 of the cotton storage casing 42, the forward end of this flexible connection 75 being adjustably anchored in connection with a member 76 on the platform 30 so that the supporting frame 70 may be elevated as desired in addition to its normal adaptability to vertically yielding movement under control of rearwardly and upwardly inclined guide rods 77 extending through brackets 78 intermediate the ends of the platform uprights 35 and provided with controlling springs 79.

Entering the lower ends of the hoods 66 are a pair of tubular uprights 80 extending from the upper forward ends of a pair of laterally spaced suction casings 81, one of which is plainly seen in Fig. 11, each of these casings having an upper head portion 82 and a lower detachable tail box 83 to which the suction is communicated in operation. Each suction casing 81 has a chamber partially around its concave inner wall 84 and is disposed at a downwardly and rearwardly inclined angle of approximately 45°. Each of the end portions of the concave inner wall 84 has openings 85 receiving the opposite ends of a cylindrical journal tube 86, whose upper end has arms 87 extending through portions of the casing head 82 to prevent rotation of the tube. The journal tube 86 of each suction casing is open at its opposite ends into the head portion 82 and tail box 83 of the respective casing and is provided with longitudinal slots 88 which are located along the inner side thereof away from the concave wall 84, the latter of which has a lengthwise slot 89 along and spaced from the inner side of the respective journal tube as plainly seen in Fig. 22.

The inner wall of each of the suction casings is approximately semicylindrical and its slot 89 is controlled by an adjustable gate 90 seen in Fig. 22 so as to thus regulate the amount of air passing inwardly of the casing through the slot. The forward angular edge of the inner wall 84 is provided with a forwardly extending and downwardly and inwardly curved guide plate 91, and each of these guide plates, whose lower reinforced and angular edges 92 are in the spaced parallel relation shown particularly in Fig. 16 has an upper extension 93, adjacent to which each of the suction casings as a whole is pivotally supported by brackets 94 pivotally connected through openings 95 in the forward cross bar of the rectangular supporting frame 70, so that the two suction casings with their curved forwardly projecting guide plates are thus yieldable toward and away from one another and laterally of the complete machine. To control this lateral swinging movement the upper portions of the hoods 66 have brackets 96 receiving the opposite angular ends of a rod 97 around which a spring 98 is coiled between the brackets 96 and thus the lower portions of the casings below their above mentioned pivots swing outwardly away from one another under control of the tension of spring 98 as the latter is compressed between the brackets 96 which at that time move inwardly toward one another.

Around each of the journal tubes 86 which, as before stated is stationarily held in connection with its respective suction casing, is a cylinder 99 within whose opposite ends are internal rings 100 as shown in Fig. 26 snugly seated on and surrounding the journal tube, each cylinder having lengthwise internal rider strips 101 extending lengthwise thereof at circumferentially spaced points as seen particularly in Fig. 27, located in internal grooves 102, and also in even uniform contact with the surface of the journal tube 86 so that the spaced wall of cylinder 99 which has slots 103 therethrough between the several rider strips 101 is divided into segments which in the rotation of the cylinder successively register with the journal tube slots 88 and are thus successively placed under the influence of the suction communicated through the journal tube slots.

Each cylinder 99 is provided at its upper end with a gear 104 engaged by a gear 105 whose shaft is mounted in bearings 106 at the upper end of the respective suction casing 81, and which is in turn engaged by a gear 107 mounted upon a cross shaft 108. This latter shaft is journaled in bearings 109 mounted upon forwardly extending brackets 110 projecting from the cross box 61 as seen in Fig. 14, and as seen particularly in Fig. 10 shaft 108 has at one projecting end a sprocket wheel 111 which, it will be noted in Fig. 2, is connected by a sprocket chain 112, to a sprocket wheel 113 on a shaft 114. This shaft is geared to a shaft 115 and the latter has a sprocket wheel 116 connected by a sprocket chain 117 with a sprocket wheel 118 mounted upon the rear axle 119 adjacent to one of the rear wheels 32.

Thus it is obvious from a comparison of Figs. 8 and 9 that the two side suction casings 81 can shift laterally toward and away from one another by virtue of the fact that the gears 105 and 108 engage in a plane at right angles to such swinging movement and the slight angular movement between the gears may be allowed for in the meshing of their teeth.

Around each of the cylinders 99 are a series of spiral perforate wings 120, each supported by brackets 121 which are attached thereto and to the cylinder, and certain of which as shown in Fig. 28 have imperforate body portions 122 with flanges 123 connected to the perforate wings and flanges 124 connected to the cylinders so as to thus space the wings off into unconnected sections which in view of the successive registration of the sections of the cylinders with the suction openings of the journal tubes, brings about an arrangement wherein the inner portions only of the opposing spiral perforate picking devices are subjected to the suction during their rotation.

It is obvious that as the entire machine as seen for instance in Figs. 1 and 2 is drawn along a row of cotton plants, with the suction casings 81 upon opposite sides of the plants, the plants will be guided properly to the space between the suction casings by virtue of the guide plates 91 and that the suction casings will be free to yield laterally under the effect of abnormally large plants, stumps and other obstructions.

During this time the suction fan is constantly in rotation with the engine or motor 58 in operation, through its driving belt 55 and the suction generated thereby in the extension 37 of the cotton storage casing 42, is communicated through the flexible tube 59, cross box 61, and the suction casings, to the head portions and tail boxes 82 and 83 of the suction casings and thus to the interior of the journal tubes 86.

The movement of the vehicle rotates the perforate spiral picking devices in relatively opposite directions so that their inner adjacent portions move rearwardly away from one another and their spirals at the same time curve upwardly, this by virtue of the parallel disposition of these picking devices and their downward and rearward inclination as before described. Thus as the plants pass between the perforate spiral picking devices, the suction communicated through the controlling devices to the inner adjacent portions of the perforate spirals has the effect of drawing the cotton locks against the perforate surface and holding the same thereon while the upward curving of the spirals pulls the lock of cotton free and carries it into the space within the concave inner wall of the respective suction casing. By the time the cotton lock so withdrawn from the plant is within the space inclosed by this concave inner wall, the suction to the respective portion of the perforate spiral has been cut off and the lock thus rests freely on the spiral from which it is withdrawn by virtue of the suction through the slot 89 of the inner wall 84, being thus drawn into the suction casing for passage upwardly through the same and through the respective hood 66 to the cross box 61 from which it passes upwardly through the flexible conduit 59 and into the extension 37 of the cotton storage casing 42. The cotton lock is pulled against the perforate section 53 of the partition and passes along the same under the influence of the section until it reaches the imperforate section 52 and being thus separated from the suction, drops into the storage casing 42.

The cotton so collected may be removed from time to time through the rear door 43 and is thus treated in its passage in such manner that it is finally extracted in a remarkably clean condition and this materially enhances its commercial value in a raw picked state.

I claim:

1. In a cotton picker, a pair of laterally spaced rotating cylinders having hollow perforate picking wings disposed spirally thereon, and internally communicating with the cylinder during part of each rotation of the latter, a wheeled frame in which said cylinders are mounted in parallel inclined relation, suction supply means for the cylinders and the hollow wings, and means for rotating the cylinders so that their spiral wings proceed upwardly and rearwardly with respect to the direction of movement of the frame.

2. In a cotton picker, a pair of laterally spaced rotating cylinders having perforate hollow wings disposed spirally thereon, and internally communicating with the cylinder during part of each rotation of the latter, suction supply means for the cylinders, a wheeled frame in which the cylinders are supported in upwardly and forwardly inclined relation, and means for rotating the cylinders so that their spirals wind upwardly and rearwardly at their inner adjacent faces as described.

3. In a cotton picker, a pair of laterally spaced rotating cylinders having hollow perforate wings disposed spirally thereon, suction supply means for the cylinders, a movable frame in which said cylinders are supported in parallel upwardly and forwardly inclined relation, means for rotating the cylinders, and a frame within the movable support and vertically adjustable with respect to the latter, to which the cylinders are connected.

4. In a cotton picker, a pair of laterally spaced rotating cylinders having suction supply means and provided with spiral peripheral wings of hollow perforate form, subject to the suction within said cylinders, and movable means for supporting the said cylinders in laterally yielding relation.

5. In a cotton picker, a pair of laterally spaced rotating cylinders having suction supply means and provided with hollow perforate wings arranged spirally on the periphery thereof and subject to the suction therein, a wheeled frame, and a frame vertically adjustable in the wheeled frame and in which the said cylinders are supported in laterally yielding relation.

6. In a cotton picker, a pair of rotating cylinders having perforate hollow wings disposed spirally thereon, suction means in communication with said wings through the said cylinders, and a wheeled frame in which the cylinders are mounted in vertically adjustable and laterally yielding relation.

7. In a cotton picker, a pair of rotating cylinders having hollow perforate wings disposed spirally thereon, and means for communicating suction to the interior of said wings along the inner adjacent faces of the cylinders.

8. In a cotton picker, a pair of rotating cylinders having hollow perforate wings disposed spirally thereon, and means for successively subjecting the said wings to internal and external suction during each rotation of the cylinders.

9. In a cotton picker, a pair of inclined laterally spaced and rotatable picker supports, hollow perforate picking wings arranged spirally of the said supports, and means for subjecting the said wings to internal and external suction respectively along the inner and outer portions of the supports as described.

10. In a cotton picker, a pair of rotatable cylindrical supports, hollow perforate wings arranged spirally on said supports, means for communicating suction through portions of the said supports to portions of the said wings, and suction casings into which portions of the said supports extend, having means to communicate suction to the exterior of the wings along portions thereof.

11. In a cotton picker, a pair of laterally spaced rotating cylinders having spirally arranged hollow perforate wings, hollow tubes on which said cylinders are journaled and around which the cylinders have separate suction compartments in communication with separate portions of the wings, said tubes having slotted openings successively communicating with the compartments of the cylinders during rotation of the latter, and suction casings supporting the tubes and in communication with the ends thereof, having slotted walls contiguous to the wings.

12. In a cotton picker, a pair of rotating cylinders in laterally spaced relation, having hollow perforate wings spirally thereon, slotted tubes on which the cylinders are journaled and around which the cylinders have suction compartments in communication with the wings, adapted to successively register with the slots of the tubes, and suction casings supporting the tubes and in communication with the ends thereof, having concave walls partially surrounding the cylinders and their wings and provided with slots opening on the wings diametrically opposite the slots of the tubes.

13. In a cotton picker, a pair of spaced parallel rotating cylinders having hollow perforate wings arranged spirally thereon, suction casings partially embracing the cylinders and their wings along the outer sides thereof, journal members for the cylinders carried by the suction casings and establishing communication between the same and the interior of the wings along the inner adjacent sides of the cylinders, said suction casings having slots communicating with the external portions of the wings along the outer sides of the cylinders, and a frame in which the suction casings are supported in relatively movable relation.

14. In a cotton picker, a pair of spaced parallel rotating cylinders having hollow perforate wings arranged spirally thereon, suction casings partially embracing the cylinders and their wings along the outer sides thereof, journal members for the cylinders carried by the suction casings and establishing communication between the same and the interior of the wings along the inner adjacent sides of the cylinders, said suction casings having slots communicating with the external portions of the wings along the outer sides of the cylinders, and a frame in which the suction casings are supported in relatively movable relation, said suction casings having forwardly projecting guide plates shiftable therewith as described.

15. In a cotton picker, a pair of spaced parallel rotating cylinders having hollow perforate wings arranged spirally thereon, suction casings partially embracing the cylinders and their wings along the outer sides thereof, journal members for the cylinders carried by the suction casings and establishing communication between the same and the interior of the wings along the inner adjacent sides of the cylinders, said suction casings having slots communicating with the external portions of the wings along the outer sides of the cylinders, and a frame in which the suction casings are supported in relatively movable relation, said casings having guide plates, a wheeled frame in which the first named frame is supported, and suction generating means on the wheeled frame flexibly connected to the said casings.

16. In a cotton picker, a pair of spaced parallel rotating cylinders having hollow perforate wings arranged spirally thereon, suction casings partially embracing the cylinders and their wings along the outer sides thereof, journal members for the cylinders carried by the suction casings and establishing communication between the same and the interior of the wings along the inner adjacent sides of the cylinders, said suction casings having slots communicating with the external portions of the wings along the outer sides of the cylinders, and a frame in which the suction casings are supported in relatively movable relation, a wheeled frame within which the first named frame is vertically adjustably mounted, and suction generating means on the wheeled frame flexibly connected to the casings as described.

17. In a cotton picker, a wheeled frame, a pair of laterally yieldable picking devices mounted in laterally spaced relation in the frame and vertically adjustable with respect thereto, a cotton storage casing on the frame having an upper extension and a cotton passage communicating with the extension and provided with a reticulate wall section, suction generating means in communication with the cotton passage through the said reticulate wall section, and a flexible conduit projecting from the extension adjacent to one end of the cotton passage and connected to the picking devices as described.

18. A picking cylinder having circumferentially spaced compartments and internal means successively communicating with said compartments during rotation of the cylinder, suction means in communication with said internal means, and perforate picking wings extending spirally around the cylinder and in communication with said compartments.

In testimony whereof I have affixed my signature.

ANDREW J. GIPSON.